US010469368B2

(12) United States Patent
Cheng

(10) Patent No.: US 10,469,368 B2
(45) Date of Patent: Nov. 5, 2019

(54) DISTRIBUTED ROUTING TABLE SYSTEM WITH IMPROVED SUPPORT FOR MULTIPLE NETWORK TOPOLOGIES

(71) Applicant: Intel Corporation, Santa Clara, CA (US)

(72) Inventor: Albert S. Cheng, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 58 days.

(21) Appl. No.: 15/554,207

(22) PCT Filed: Mar. 28, 2015

(86) PCT No.: PCT/US2015/023203
§ 371 (c)(1),
(2) Date: Aug. 28, 2017

(87) PCT Pub. No.: WO2016/159945
PCT Pub. Date: Oct. 6, 2016

(65) Prior Publication Data
US 2018/0083868 A1    Mar. 22, 2018

(51) Int. Cl.
*H04L 12/721* (2013.01)
*H04L 12/741* (2013.01)
(Continued)

(52) U.S. Cl.
CPC .............. *H04L 45/44* (2013.01); *H04L 45/22* (2013.01); *H04L 45/745* (2013.01); *H04L 45/7453* (2013.01); *H04L 49/109* (2013.01)

(58) Field of Classification Search
CPC .... H04L 45/44; H04L 45/745; H04L 45/7453
See application file for complete search history.

(56) References Cited

U.S. PATENT DOCUMENTS 5,970,232 A * 10/1999 Passint .............. G06F 15/17381
370/351
7,103,626 B1    9/2006 Recio et al.
(Continued)

OTHER PUBLICATIONS

Extended European International Search report received in European Patent Application No. 15887954, (PCT/US2015023203), dated Aug. 29, 2018, 9 pages.
(Continued)

Primary Examiner — Albert T Chou
(74) Attorney, Agent, or Firm — Grossman, Tucker, Perreault & Pfleger, PLLC

(57) ABSTRACT

Generally, this disclosure provides systems, methods and computer readable media for switching systems employing distributed routing tables to provide improved support for multiple network topologies, configurations and routing modes. A routing system of a switch, for routing a packet from an input port of a switch to an output port, may include memory modules to store routing tables configured to store entries, each entry configured to store output port identifiers. The routing system may also include a table address generation module configured to select an entry from the routing tables based in part on a first subset of a Destination Location ID (DLID) associated with the packet. The table address generation module may further be configured to select one or more output ports from the selected entries, the selected output ports based in part on a second subset of the DLID.

33 Claims, 12 Drawing Sheets

(51) Int. Cl.
   *H04L 12/933* (2013.01)
   *H04L 12/707* (2013.01)
   *H04L 12/743* (2013.01)

(56) References Cited

U.S. PATENT DOCUMENTS

| | | | |
|---|---|---|---|
| 2003/0231633 | A1 | 12/2003 | Aramizu et al. |
| 2005/0089038 | A1* | 4/2005 | Sugai ................ H04L 45/00 370/394 |
| 2005/0141518 | A1 | 6/2005 | Schiller et al. |
| 2008/0123679 | A1* | 5/2008 | Scott ................ G06F 11/0781 370/422 |
| 2008/0267183 | A1 | 10/2008 | Arndt et al. |
| 2010/0211775 | A1* | 8/2010 | Vogt ................ H04L 29/12801 713/163 |
| 2011/0246489 | A1 | 10/2011 | Pope et al. |
| 2013/0301645 | A1 | 11/2013 | Bogdanski et al. |
| 2014/0347994 | A1* | 11/2014 | Kapadia ................ H04L 47/125 370/235 |
| 2016/0344618 | A1* | 11/2016 | Oprea ................ H04L 45/40 |
| 2017/0264533 | A1* | 9/2017 | Chopra ................ H04L 45/306 |

OTHER PUBLICATIONS

Martinez et al, "Supporting fully adaptive routing in infiniband networks", Parallel and Distributed Processing Symposium, 2003. International Apr. 22, 2003 Piscataway, NJ, USA, IEEE, XP010645338, ISBN:978-0-7695-1926-5.

International Search Report and Written Opinion issued in PCT Application No. PCT/US2015/023203, dated Feb. 18, 2016, 11 pages.

International Preliminary Report on Patentability and Written Opinion issued in PCT Application No. PCT/US2015/023203, dated Oct. 3, 2017, 7 pages.

Examination report received in European Patent Application No. 15887954.4, dated Aug. 9, 2019, 7 pages.

* cited by examiner

Configure routing tables to store a plurality of entries, each of the entries to store one or more output port selections for routing a packet from an input port of a switch to an output port of the switch

1110

Select an entry from one or more of the routing tables, the entry selection based in part on a first subset of a Destination Location ID (DLID) associated with the packet

1120

Select one or more output ports from the selected entries, the selected output ports based in part on a second subset of the DLID

DISTRIBUTED ROUTING TABLE SYSTEM WITH IMPROVED SUPPORT FOR MULTIPLE NETWORK TOPOLOGIES

CROSS-REFERENCE TO RELATED APPLICATIONS

This present application is a National Phase Application Filed Under 35 U.S.C. 371 claiming priority to PCT/US2015/023203 filed Mar. 28, 2015, the entire disclosure of which is incorporated herein by reference.

FIELD

The present disclosure relates to distributed network routing table systems, and more particularly, to distributed network routing table systems with improved support for multiple network topologies.

BACKGROUND

High Performance Computing (HPC) systems generally employ relatively large numbers of processing nodes that are interconnected in a network fabric of switches. In some HPC systems there may be hundreds of thousands of processors and tens of thousands of switches, or more, in a network. The networks may be arranged in any of a wide variety of known topologies including, for example, Dragonfly, Fat-Tree, Flattened Butterfly and Torus topologies, which may be configured in 2, 3, or more dimensions. Data may be transmitted between processors, for example in packets, which are routed through the switches by dynamically connecting one of a number of switch input ports to one of a number of switch output ports, for example based on an address associated with the packet. Different networks may be configured to support different routing and addressing modes.

Existing switches are typically designed to target a specific network topology or a small subset of topologies. These switches may not be well suited to handle other types of network configurations and addressing modes. Additionally, existing switches generally lack the capacity to efficiently deal with network faults (e.g., broken links and/or switches), requiring network management software to overcompensate for these faults by disabling relatively large portions of the network to prevent a packet from taking a path that leads to a dead end.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 8 illustrates routing tables consistent with example embodiments of the present disclosure;

FIG. 11 illustrates a flowchart of operations of one example embodiment consistent with the present disclosure.

Figure 1:
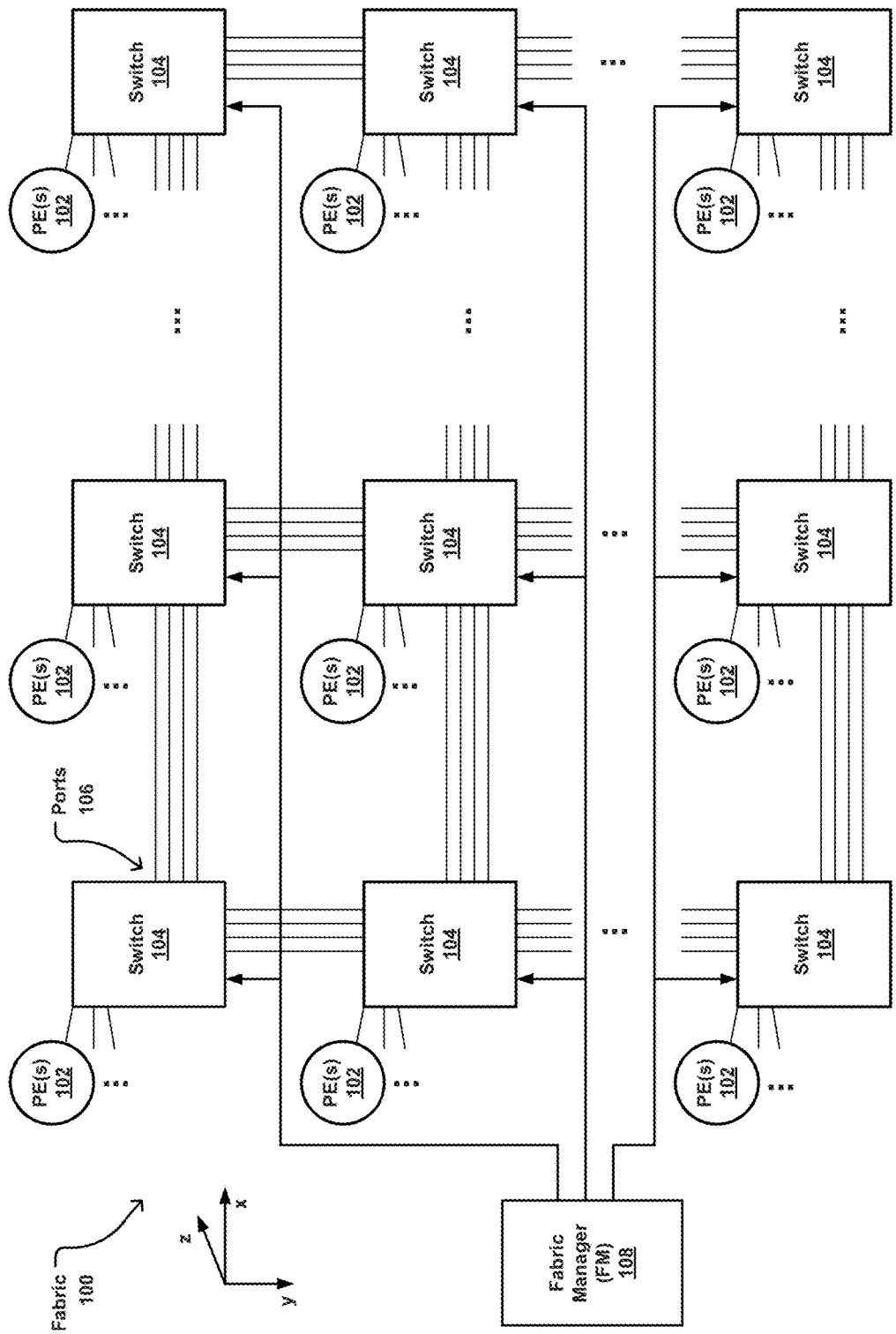
FIG. 1 illustrates a top level HPC system network fabric diagram consistent with an example embodiment of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for switching systems employing distributed routing tables to provide improved support for multiple network topologies, configurations and routing modes. Supported topologies may include, for example, Dragonfly, Fat-Tree, Flattened Butterfly and Torus topologies. Supported routing modes may include, for example, deterministic minimal, deterministic non-minimal and adaptive, as will be described in greater detail below. The switches and routing tables may be configured to support both a flat node addressing scheme and a hierarchical node addressing scheme. The hierarchical addressing scheme may allow the node addresses (Destination Location IDs or DLIDs) to be partitioned in a relatively flexible manner with adjustable partitioning boundaries to support a variety of network sizes and configurations. Additionally, in some embodiments, improved network fault tolerance is provided through the use of override routing tables configured to route around malfunctioning links or switches during random routing. A network or fabric manager may be configured to program the routing tables and associated control registers of the switches based on the network topology, size and addressing modes.

When routing a packet with hierarchical node addressing, 3 possible types of routing may be employed at each routing table at each port of a switch. The first type is configured to provide direct (minimal) routing choices to guide a packet toward its destination through direct paths, either starting from the source node or from an intermediate node after taking a number of indirect hops. A second type is configured to provide indirect (non-minimal) routing choices used to disperse traffic and improve load balancing in accordance with many varieties of network topologies. A third type is configured to provide alternate routing choices to override the paths provided by the direct or indirect tables if network faults are detected. Each routing table may include multiple sub-tables for each hierarchical sub-field of the DLID address. This enables both indirect routing and direct routing at each level of the hierarchy for the topologies and routing modes that apply. For example, a packet may be routed directly through one hierarchy (e.g., from one dimension to another dimension), and indirectly through another hierarchy (e.g., from one switch to another switch within a dimension).

When routing a packet in deterministic mode, only one routing choice from each sub-table is provided, in a predictable manner (as will be more fully described below), based on, for example, information in the packet header. When routing a packet in adaptive mode, however, multiple routing choices may be provided, for example by providing an element of randomness (as will also be more fully described below). The routing choices from the sub-tables may then be down-selected to a smaller number of final candidates based on a number of factors including, for example, the routing method, the virtual lane (VL) of the packet, and the location of the packet relative to the hierarchy of the network. A final selection of routing choice may then be based on congestion information associated with each route.

When routing a packet with flat node addressing, where the DLID is not partitioned into sub-fields associated with network hierarchies, the routing tables may be combined into one larger table with entries that map directly to an end node or destination. Both deterministic and adaptive routing are also possible with flat node addressing although indirect and override options would typically not be used.

The packet header may generally include a routing control (RC) field that specifies the type of routing desired for that packet (e.g., deterministic/adaptive, direct/indirect).

FIG. 1 illustrates a top level HPC system network fabric diagram 100 consistent with an example embodiment of the present disclosure. The fabric 100 is shown to include any number of processing element (PE) 102 interconnected through switches 104. PEs 102 and switches 104 may sometimes be referred to as nodes in the fabric 100. The switches 104 may be configured with any number of input and output ports 106 that may link the switch to other switches or to PEs 102. Any given switch 104 may have zero, one, two or more PEs 102 linked to and/or otherwise associated with that switch. The fabric 100 in this illustration is laid out in a 2-dimensional array (along the x and y axis) for simplicity. In some embodiments, the fabric may be extended into a third dimension (along the z axis) and/or into higher dimensions not shown. In this simplified example, the switches are shown to be connected only to adjacent switches, although this need not be the case. In general, the switches 104 and PEs 102 may be arranged in any of a wide variety of topologies ranging from relatively simple configurations to more complex configurations. Fabric topologies may be chosen depending on their suitability to a particular application.

The fabric 100 is also shown to include a fabric manager (FM) 108, which may be a processor configured to program the routing tables and control status registers (CSRs) of the switches 104, as will be described in greater detail below. In some embodiments, the FM 108 may be a processor dedicated to the management function. In some embodiments, one or more of the PEs 102 may be configured to serve as the FM 108.

In some embodiments, data or other information may be transmitted from one PE to any other PE by encapsulating the data in a packet that includes a header specifying a destination node address (DLID) and other routing information. The packet may then be routed along a path through any number of switches that each determines the next step in the path based on the packet header contents and further based on routing tables and CSRs within that switch, as will be described in greater detail below.

Figure 2:
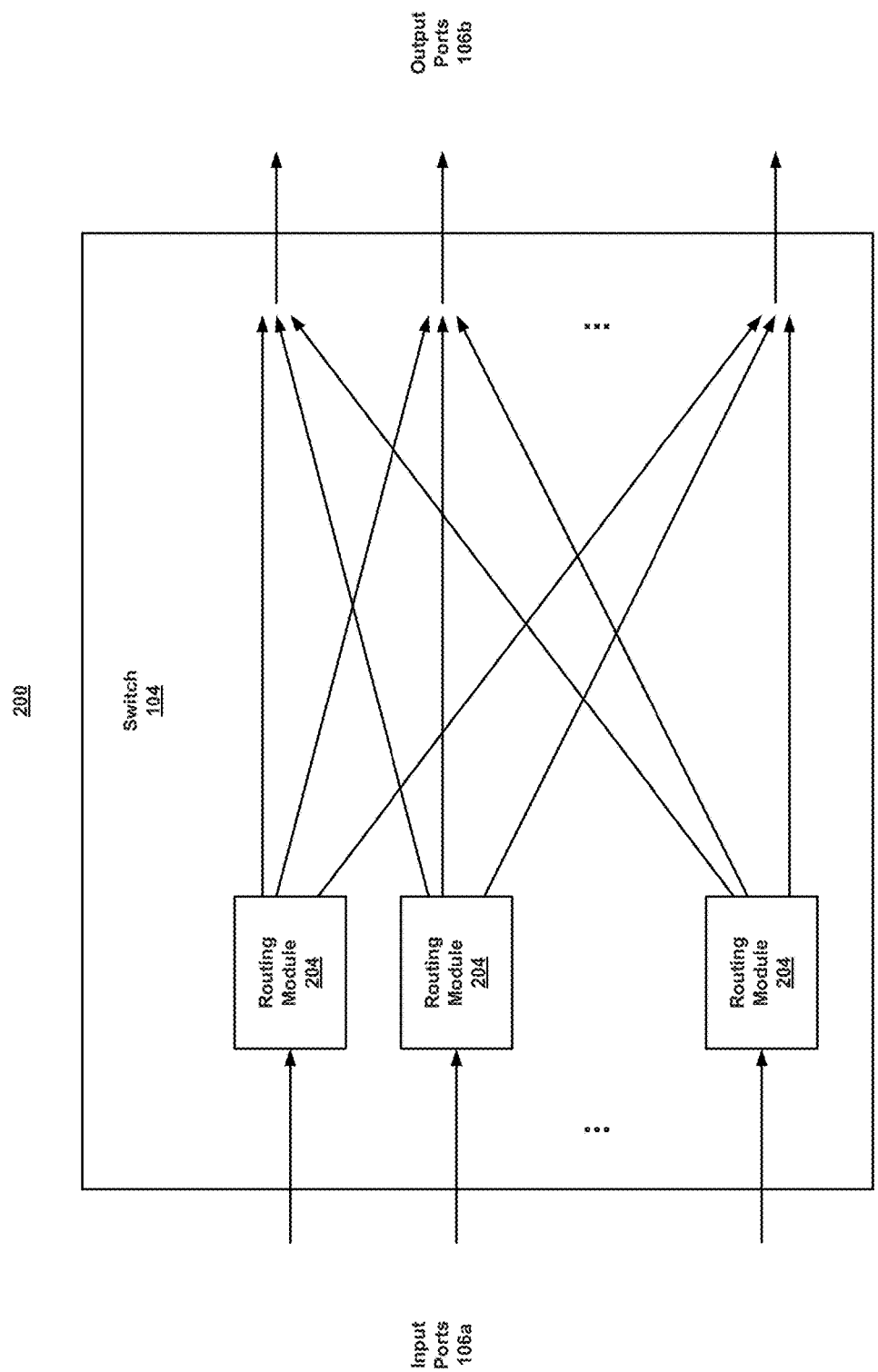
FIG. 2 illustrates a simplified block diagram of a network switch consistent with an example embodiment of the present disclosure.

FIG. 2 illustrates a simplified block diagram 200 of a network switch consistent with an example embodiment of the present disclosure. The switch 104 is shown to include a number of input ports 106a and output ports 106b. In some embodiments, there may be 64 input ports and 64 output ports, although in general there may be any number of such ports. In some embodiments, 16 ports may be connected to PEs 102 and 48 ports may be connected to other switches 104 in the network fabric, although, in general, other distributions are possible. The switch 104 is shown to further include routing modules (also referred to as routing systems, or distributed routing table systems) 204, which may be associated with each input port 106a and be configured to dynamically route a packet arriving on that input port to any one of the output ports 106b. The choice of output port may be based on the packet header contents and on the routing tables and CSRs associated with that routing module 204. In some embodiments, the switch 104 may be incorporated in a System-on-a-Chip (SoC) architecture and may also include a processor or CPU (not shown) configured to execute software (or firmware, etc.) to assist with control of the routing modules 204 or any other suitable tasks.

Figure 3:
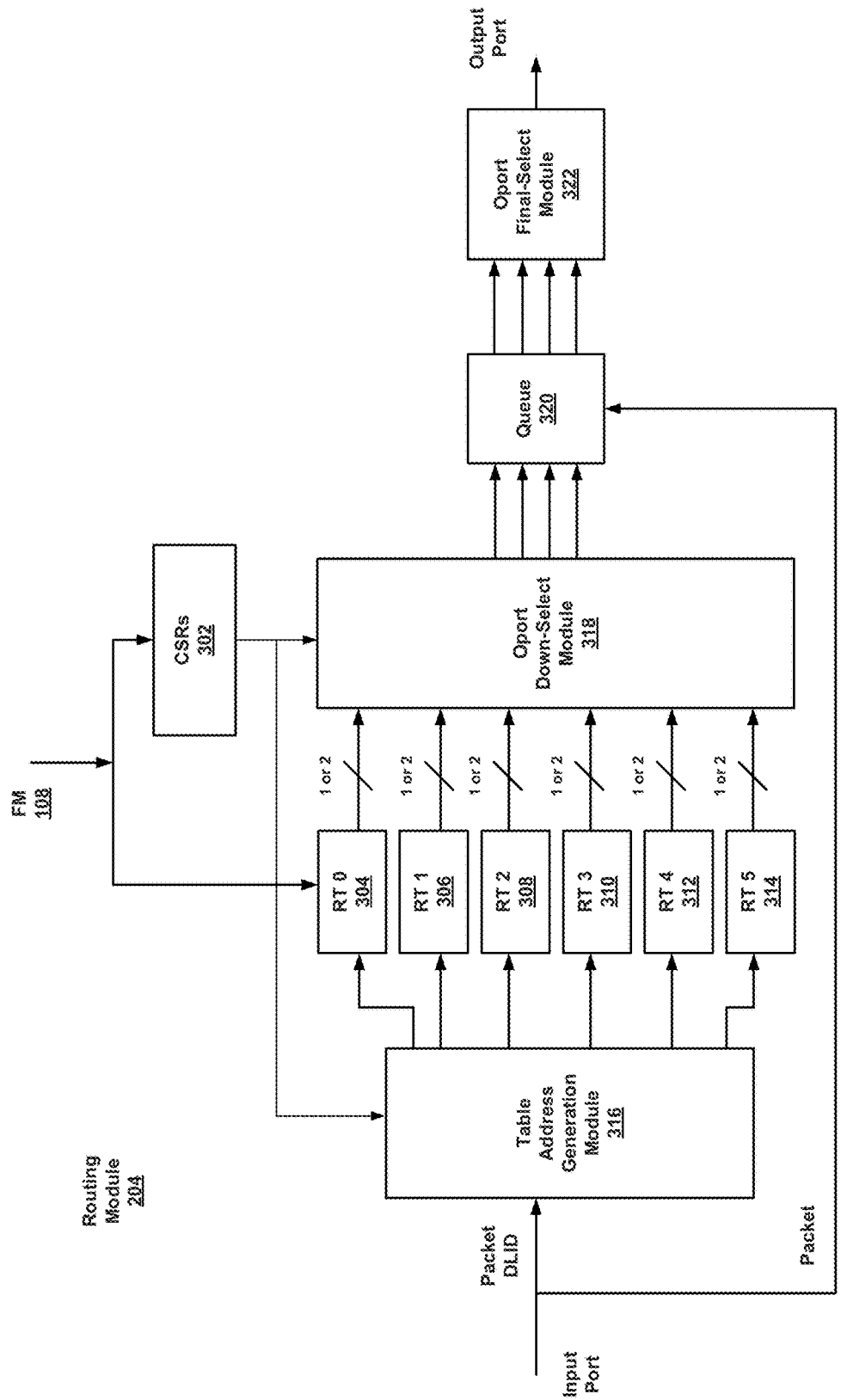
FIG. 3 illustrates a block diagram of a switch routing module consistent with an example embodiment of the present disclosure.

FIG. 3 illustrates a block diagram of a switch routing module 204 consistent with an example embodiment of the present disclosure. The routing module 204 is shown to include a routing table address generation module 316, a number of memory modules configured to store routing tables (RT 0 304, RT 1 306, RT 2 308, RT 3 310, RT 4 312, RT 5 314), control status registers CSRs 302, an output port (Oport) down-selection module 318, a queue memory 320 and an Oport final-selection module 322.

Figure 5:
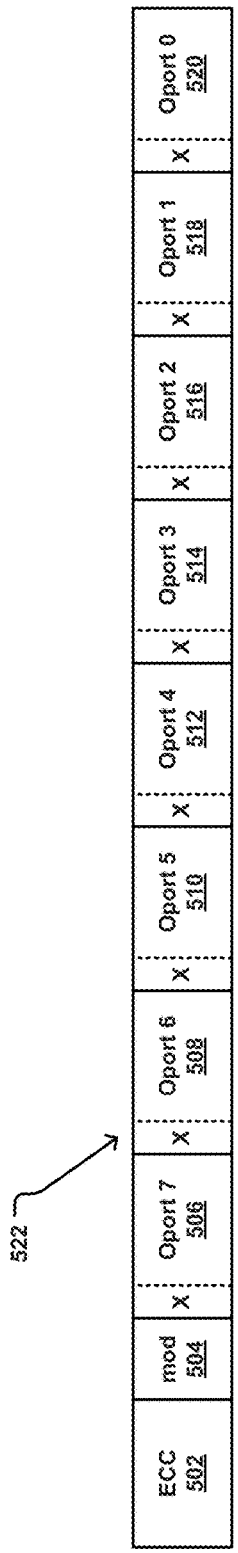
FIG. 5 illustrates a routing table entry consistent with an example embodiment of the present disclosure.

Routing tables 0-5 may be configured in various ways (e.g., as direct, indirect and override tables in 2-dimensional and 3-dimensional varieties) as will be explained in greater detail below, in connection with FIGS. 8 and 9. In each case, however, the tables include multiple entries, and each entry includes multiple Oport specifications or identifiers (e.g., as illustrated in FIG. 5). In some embodiments, each RT may include 1024 entries, with each entry specifying 8 Oports. Routing table address generation module 316 may be configured to generate (for each packet) an address into each of the RTs. The address selects an entry within that RT and an Oport from within that selected entry. The address generation is based on the DLID of the packet and other information (including the content of CSRs 302), as described later in connection with FIG. 6. In the case of deterministic mode routing, one Oport entry is selected from each RT, while in the case of adaptive mode routing 2 Oports may be selected from each RT.

Oport down-select module 318 may be configured to narrow the Oport selections from the 12 possible choices out of the RTs, down to 4 candidates in adaptive mode and 1 candidate in deterministic mode. The down-select process is described in greater detail in connection with FIG. 7 below.

The down-selected Oports may be stored (along with the packet) in a memory queue 320 in preparation for transmission. The Oport final-selection module 322 may be configured to choose one Oport from among the candidates based on network congestion levels (e.g., associated with the Oport candidates). The packet may then be transmitted out from the switch through the chosen Oport. In some embodiments, congestion information may be provided by the FM 108 and may be associated with global conditions (e.g., congestion through the network fabric). Congestion information may also be generated within the switch and be associated with local conditions (e.g., each port may share or exchange congestion information with other ports in that switch).

Although only 6 RTs are shown and described in this example, it will be appreciated that, in general, a system may employ any number of RTs of any size. Additionally, in general, any number of Oport choices may be selected from each RT in adaptive mode and further down selected to any other number of choices. Also, in some embodiments, the Oport final-selection module 322 may be configured or located in a pre-queue position rather than a post-queue position as illustrated.

In some embodiments, the switch routing module 204 may be incorporated in a System-on-a-Chip (SoC) architecture and may also include a processor or CPU (not shown) configured to execute software (or firmware, etc.) to assist with control of the routing modules 204 components or any other suitable tasks.

Figure 4:
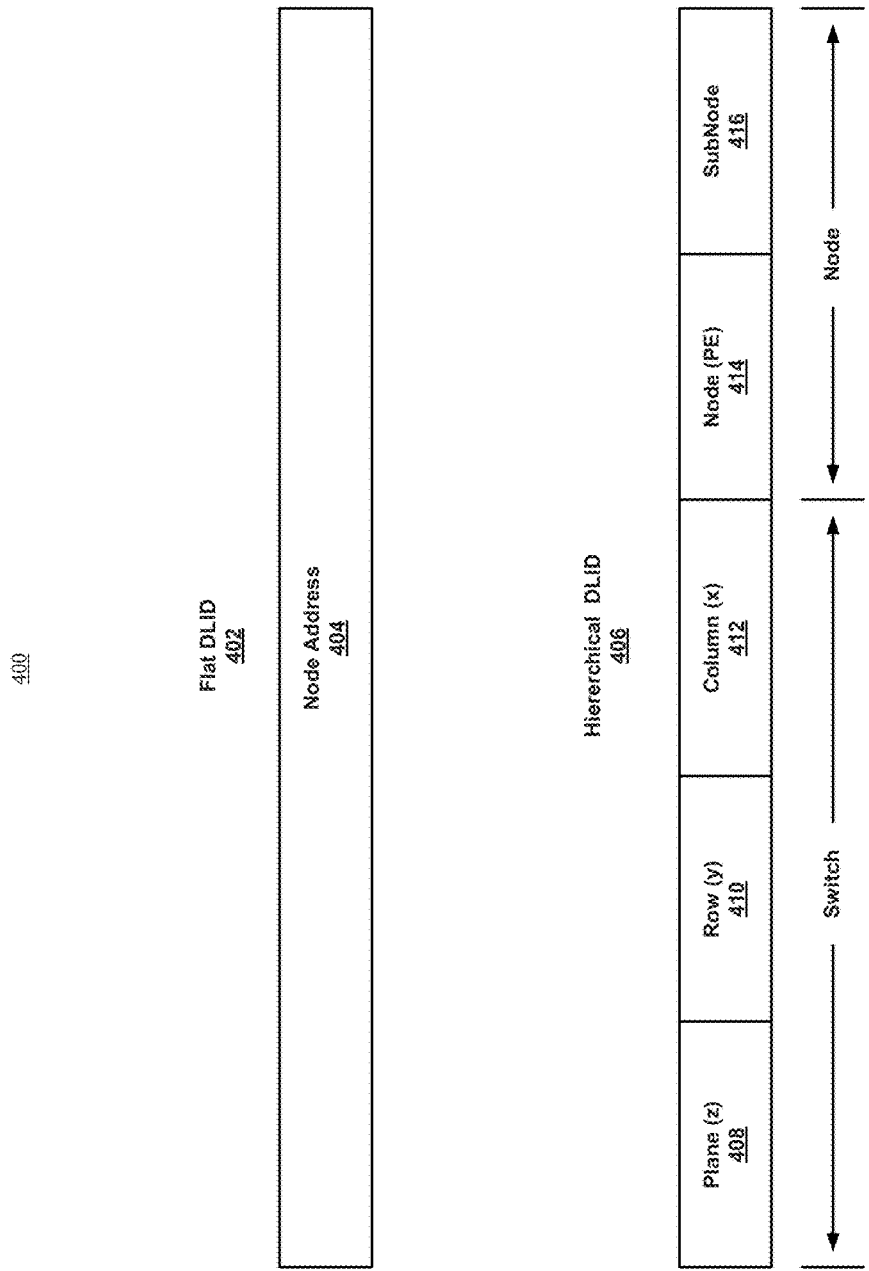
FIG. 4 illustrates address formats consistent with an example embodiment of the present disclosure.

FIG. 4 illustrates DLID address formats 400 consistent with an example embodiment of the present disclosure. A flat DLID address format 402 is shown alongside a hierarchical DLID address format 406. As described previously, each input port of a switch may be associated with a set of routing tables configured to guide the incoming packet to an output port of the switch. The DLID of the packet may be used to index into one of the routing tables to obtain an RT entry that specifies an output port of the switch through which that packet will be routed on its way to another switch (or destination node).

In flat addressing mode, the DLID specifies a node address 404 that is not partitioned and instead simply maps directly to an end node or destination. In this mode, the fabric manager 108 may arbitrarily assign DLIDs to each end node.

In hierarchical addressing mode, however, the DLID may be partitioned into multiple subfields to support configurable network topologies and sizes. In a 2-D geometric grouping (e.g., a plane of switches in a fabric), a switch may be identified by a column subfield 412, specifying the x-coordinate of a switch within the plane, and a row subfield 410, specifying the y-coordinate of the switch. In a 3-D geometric grouping (e.g., a cube of multiple planes of switches), the switch may be identified by an additional plane subfield 408 specifying the z-coordinate of the switch. Additional subfields may specify the particular destination node or PE 414 and optionally a subnode 416 (e.g., addressable sub-processing elements of a PE 414). The widths of the subfields (e.g., number of bits) may be chosen based on the size of the fabric (e.g., number of planes, rows, columns, nodes, etc.) Of course these are just examples, and the size and number of subfields (e.g., the partitioning) may be changed to accommodate any type of network topology, whether existing or to be developed.

In some embodiments, flat node addressing may also support sub-nodes. This may be accomplished, for example, by assigning the flat node address DLIDs 404 to the sub-nodes.

It will be appreciated that a hierarchical addressing mode may generally support a fabric with a larger number of destination nodes than would be possible with a flat addressing mode, assuming similarly sized routing tables. For example, if a routing table had 200 entries, then 200 destination nodes could be addressed in flat addressing mode. The same routing table in hierarchical mode, however, could use 100 entries to route to a neighborhood (e.g., a region of the fabric) and then use the other 100 entries to route to a destination node, effectively addressing 100×100 (or 10,000) destination nodes.

FIG. 5 illustrates a routing table entry 500 consistent with an example embodiment of the present disclosure. Each entry in the routing tables may specify or identify a number of Oports. In this example, the routing table entry includes 8 Oport fields (Oport-0 520 through Oport-7 506). The Oport fields may be of a suitable bit length to accommodate the number of output ports on the switch, for example 64 Oports. An additional "X" bit (or status bit) 522 is shown to be associated with each Oport and may be used for a variety of purposes. In some embodiments, the X bit may indicate that the corresponding Oport is valid when the RT is configured as an override table, as will be explained in greater detail below. The mod field 504 may be configured to indicate the number of valid Oport choices in this entry. For example, mod=0 can indicate that only 1 Oport choice is valid and mod=7 can indicate that all 8 Oport choices are valid. In some embodiments, the mod field may be 3 bits in length. An error correction code (ECC) field 502 may also be included in the entry to provide error protection. In some embodiments, the ECC field may be 8 bits in length.

Figure 6A:
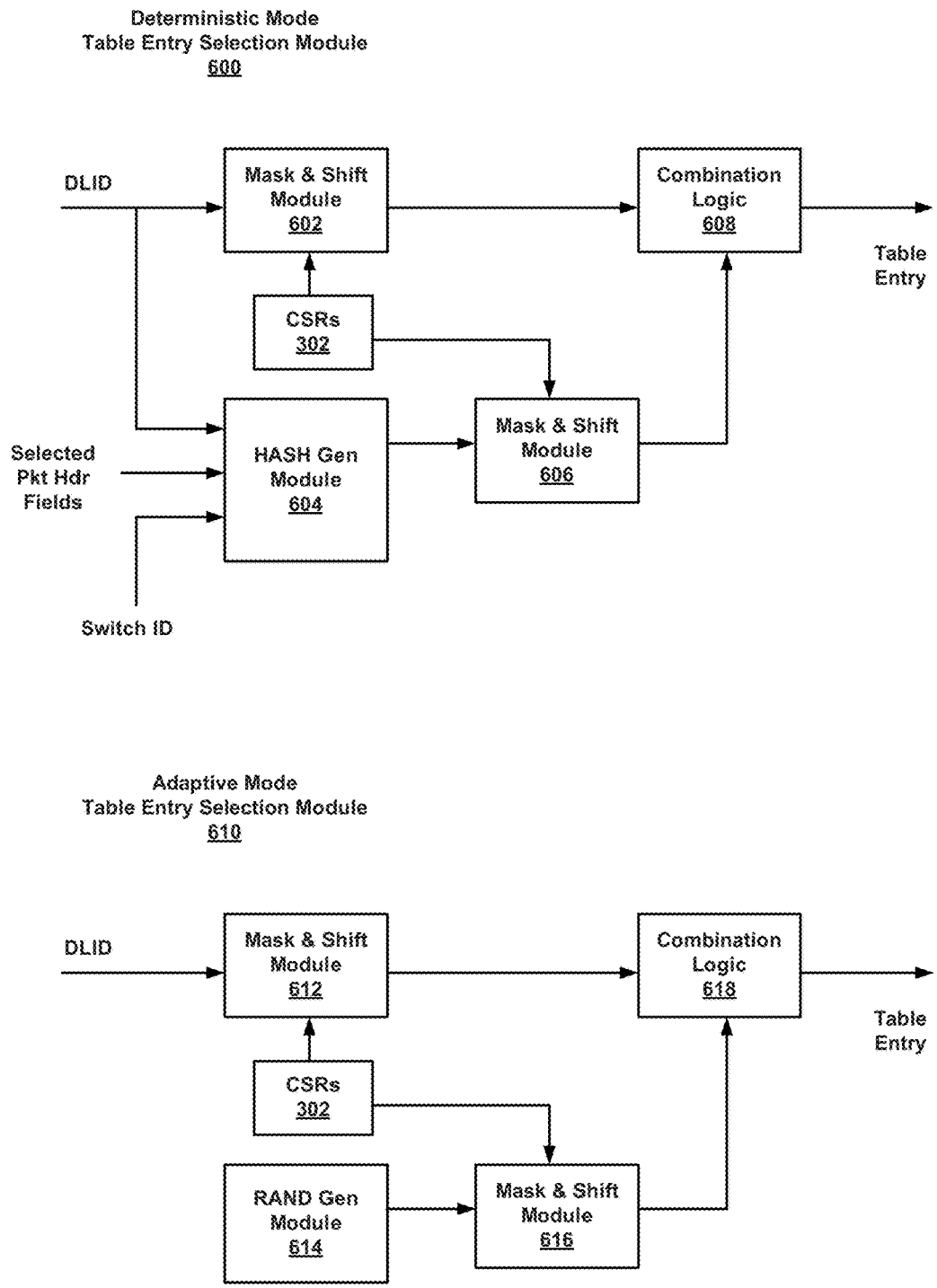
FIGS. 6(*a*) and 6(*b*) illustrate a block diagram of a table address generation module consistent with an example embodiment of the present disclosure.
Figure 6B:
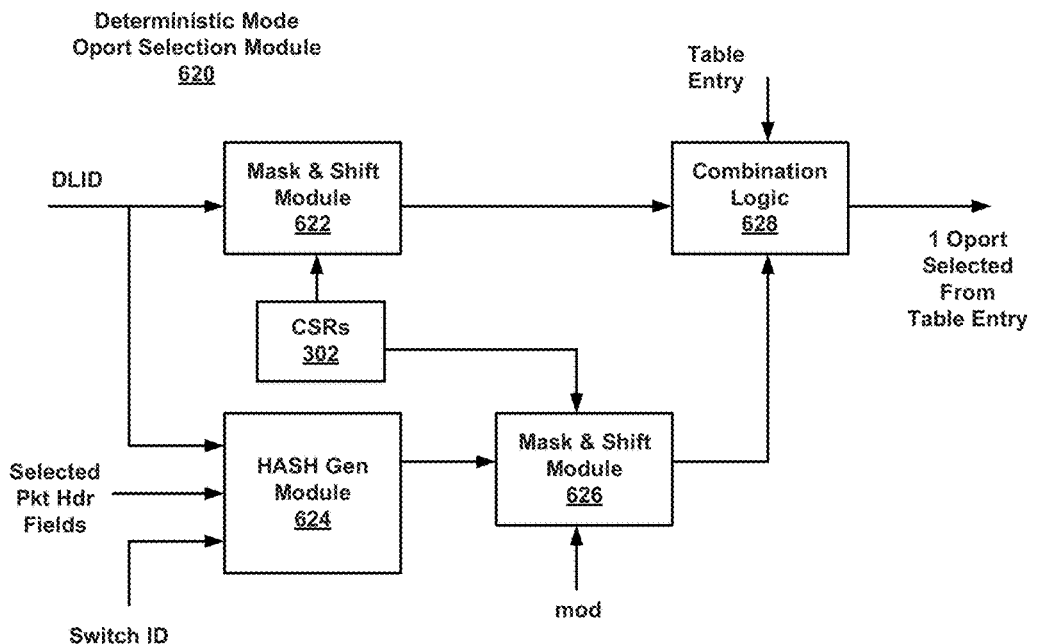
Figure 6B:
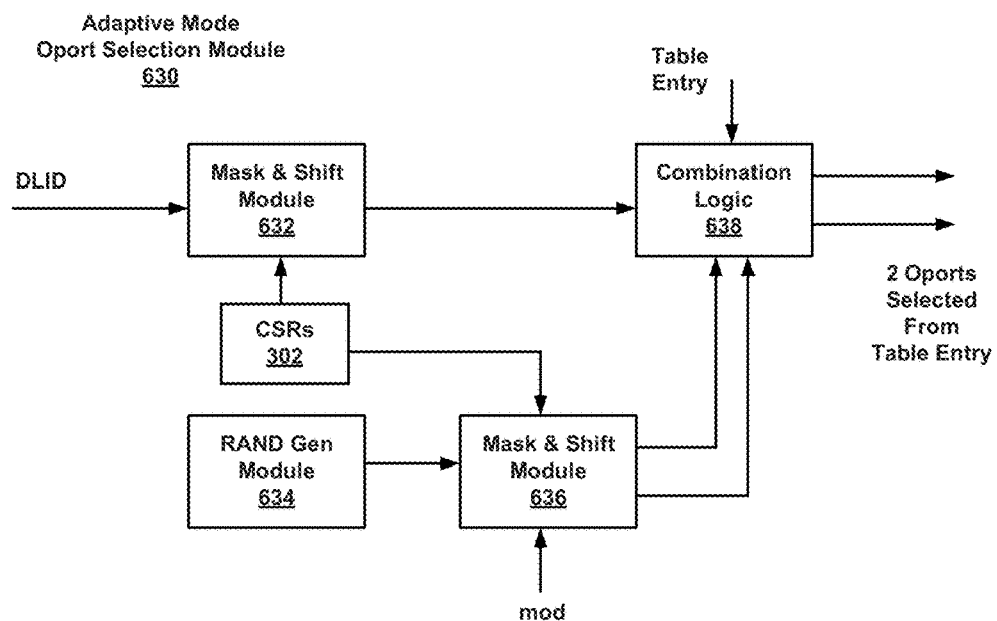

FIGS. 6(*a*) and 6(*b*) illustrate a block diagram of a table address generation module 316 consistent with an example embodiment of the present disclosure. Table address generation module 316 is shown to include deterministic mode table entry selection module 600 and adaptive mode table entry selection module 610, in FIG. 6(*a*), and deterministic mode Oport selection module 620 and adaptive mode Oport selection module 630, in FIG. 6(*b*).

Deterministic mode table entry selection module 600 may be configured to select an entry from the RT based on the DLID, selected fields from the packet header and/or the switch ID. Examples of selected fields from the packet header are described later in connection with FIG. 10 which presents a sample packet format.

Mask and shift module 602 may be configured to extract certain bits or bit fields from the DLID, for example through bitwise logical mask and shift operations. The extraction process is guided by (e.g., the bit field definitions are provided by) the CSRs 302, which in turn may be programmed by the FM 108. Although the bit extraction processes described herein use mask and shift operations as an example illustration, it will be appreciated that any method of extracting and recombining one or more bits or bit fields (whether the bits are adjacent to each other or not) may be employed.

Hash generation module 604 may be configured to generate a hash value based on the DLID, selected fields from the packet header and/or the switch ID. The hash value may be computed using any of a number of known hashing functions or algorithms that are configured to transform data of an arbitrary size to another typically smaller and fixed size value. The generated hash value is then processed by mask and shift module 606, in the same manner as described above with respect to module 602, to extract certain bit fields from the hash value, as specified by the CSRs 302. The processed DLID and hash value are then combined by combination logic 608, which may be configured, for example, to perform a bitwise OR operation, to generate the table entry selection. This process may be expressed, for example, in an equation form such as:

$$\text{Table Entry Select} = ((DLID[x{:}y] \& TE\_MASK[x{:}y]) \ll | \gg TE\_SHIFT) | ((HASH[n{:}m] \& H\_MASK[n{:}m]) \ll | \gg H\_SHIFT)$$

where [x:y] and [n:m] represent bit field ranges and <<|>> represents a left or right bit shift, the direction of which may also be specified by the CSRs. The table entry mask (TE_MASK), table entry shift (TE_SHIFT), hash mask (H_MASK) and hash shift (H_SHIFT) may all be specified by CSRs 302.

Adaptive mode table entry selection module 610 may be configured to select an entry from the RT based on the DLID.

Mask and shift module 612 may be configured to extract certain bits or bit fields from the DLID, for example through bitwise logical mask and shift operations. The extraction process is guided by (e.g., the bit field definitions are provided by) the CSRs 302, which in turn may be programmed by the FM 108.

Rand number generation module 614 may be configured to generate a pseudo-random value which is then processed by mask and shift module 616 to extract certain bit fields from the random value, as specified by the CSRs 302. The processed DLID and random value are then combined by combination logic 618, which may be configured, for example, to perform a bitwise OR operation, to generate the table entry selection. This process may be expressed, for example, in an equation form such as:

Table Entry Select=((DLID[$x{:}y$]& TE_MASK[$x{:}y$])
<<|>>TE_SHIFT)|((RAND[$n{:}m$]& R_MASK[$n{:}m$])<<|>>R_SHIFT)

where [x:y] and [n:m] represent bit field ranges and <<|>> represents a left or right bit shift, the direction of which may also be specified by the CSRs. The table entry mask (TE_MASK), table entry shift (TE_SHIFT), random mask (R_MASK) and random shift (R_SHIFT) may all be specified by CSRs 302.

Deterministic mode Oport selection module 620 may be configured to select an Oport from the table entry chosen above. The selected Oport may also be based on the DLID, selected fields from the packet header and/or the switch ID in a manner similar to the table entry selection.

Mask and shift module 622 may be configured to extract certain bits or bit fields from the DLID, the extraction process is guided by the CSRs 302.

Hash generation module 624 may be configured to generate a hash value which is then processed by mask and shift module 626 to extract certain bit fields from the hash value, as specified by the CSRs 302. The hash value may be further processed by performing a modulus operation with the mod field from the table entry. The processed DLID and hash value are then combined by combination logic 628 to generate the selected Oport. This process may be expressed, for example, in an equation form such as:

Oport Select=((DLID[$x{:}y$]& OS_MASK[$x{:}y$])
<<|>>OS_SHIFT)|(((HASH[$n{:}m$]&
OS_H_MASK[$n{:}m$])<<|>>OS_H_SHIFT) %
(mod+1))

where the "%" operator indicates a modulus operation (e.g., using the remainder of an arithmetic division). The Oport select mask (OS_MASK), Oport select shift (OS_SHIFT), Oport select hash mask (OS_H_MASK) and Oport select hash shift (OS_H_SHIFT) may all be specified by CSRs 302.

Adaptive mode Oport selection module 630 may be configured to select two Oports from the table entry chosen above. The selected Oports may be based on the DLID and a random value.

Mask and shift module 632 may be configured to extract certain bits or bit fields from the DLID, the extraction process is guided by the CSRs 302.

Random number generation module 634 may be configured to generate a pseudo-random value which is then processed by mask and shift module 636 to extract certain bit fields from the random value, as specified by the CSRs 302. The random values may be further processed by performing a modulus operation with the mod field from the table entry. Two processed random values may be generated by using variations of the mod field (e.g., a bitwise OR of the bits in the mod field). The processed DLID and random values are then combined by combination logic 638 to generate the selected Oports. This process may be expressed, for example, in an equation form such as:

Oport Select 1=((DLID[$x{:}y$]& OS_MASK[$x{:}y$])
<<|>>OS_SHIFT)|(((RAND[$n{:}m$]&
OS_R_MASK[$n{:}m$])<<|>>OS_R_SHIFT) %
(mod+1))

Oport Select 2=((DLID[$x{:}y$]& OS_MASK[$x{:}y$])
<<|>>OS_SHIFT)|((((RAND[$n{:}m$]&
OS_R_MASK[$n{:}m$])<<|>>OS_R_SHIFT)+(bitwise OR of mod bits))

% (mod+1))

The Oport select mask (OS_MASK), Oport select shift (OS_SHIFT), Oport select random mask (OS_R_MASK) and Oport select random shift (OS_R_SHIFT) may all be specified by CSRs 302.

Of course, the above are just examples. In alternate embodiments, any number of Oports may be selected using any suitable method.

Because each RT has its own set of table entry and Oport section modules, as well as CSRs, each of the tables may be independently accessed by a combination of some subset of DLID bits and some subset of hash or random bits. Depending on the topology and the addressing mode, an RT can be configured over a spectrum of possibilities ranging from the use of only DLID bits to select an Oport, at one extreme, to the use of only hash or random bits to select an Oport, at the other extreme. This flexibility allows these tables to support a relatively wide variety of network topologies and addressing modes, as will be explained in greater detail below.

In deterministic mode, each packet with a given DLID may generally be routed through the same path because the hash function will map the DLID (and other packet header fields associated with the DLID in an invariant manner) to the same value for each such packet. In adaptive mode, however, packets with the same DLID may take different paths due to the randomization function.

In some embodiments, routing table 0 (RT0) may be configured for an additional purpose. When a packet has arrived at a its destination switch, the RT0 entries at that switch, which might otherwise typically be configured as a direct table to lead the packet toward the destination switch, would serve no purpose and be wasted. Instead, this RT0 may be used (for example, with a different set of mask and switch registers) to enable the Oport entries allocated for this switch DLID to be reused to guide the packet toward the destination using an alternate set of rules.

Figure 7:
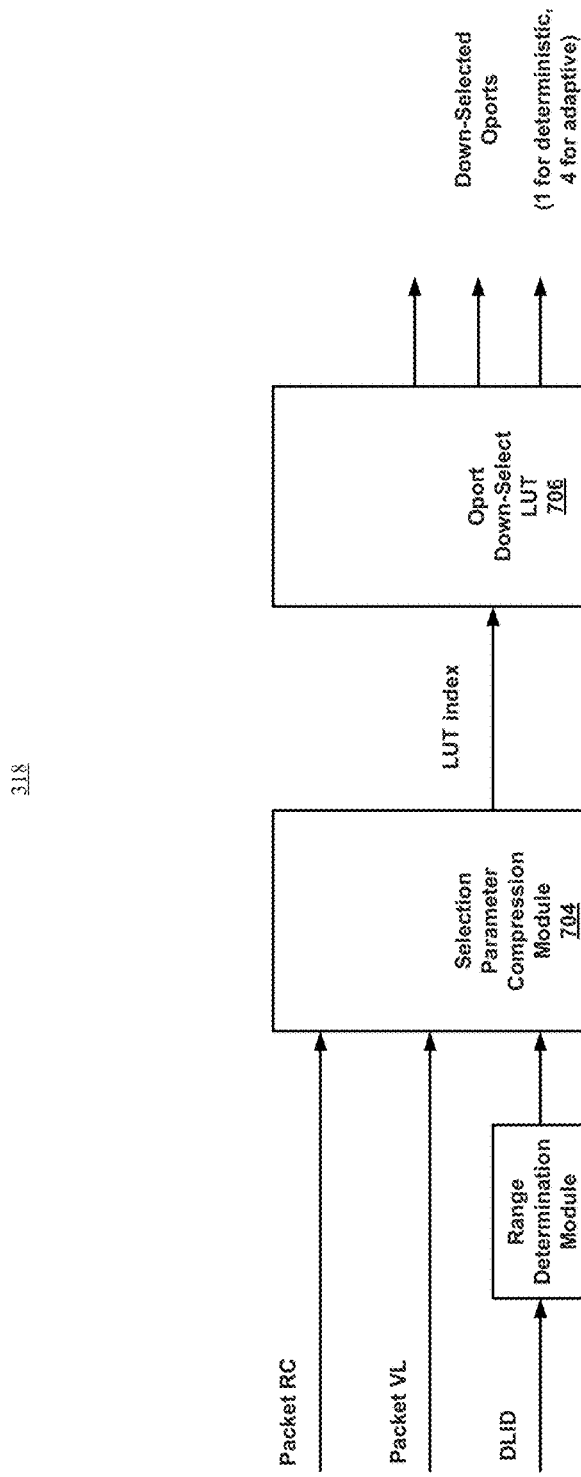
FIG. 7 illustrates a block diagram of an output port down-selection module consistent with an example embodiment of the present disclosure.

FIG. 7 illustrates a block diagram of an output port down-selection module 318 consistent with an example embodiment of the present disclosure. This module 318 may be configured to down-select the Oports that were obtained from the RTs (up to 12 Oports, 2 from each of the 6 tables, in this example) to a single Oport, in deterministic mode, or up to 4 Oports in adaptive mode (2 minimal and 2 non-minimal choices, in this example). The down-selection may be based on a number of factors including the packet routing control (RC) value, the packet VL, the Oport X (status) bits and/or a determination of whether or not the DLID is within a certain range or collection of ranges (e.g., indicating the location of the packet relative to the hierarchy of the network and its target destination). The output port down-selection module 318 is shown to include a DLID range determination module 702, a selection parameter compression module 704 and an Oport down-select lookup table (LUT) 706.

DLID range determination module 702 may be configured to compare the packet DLID, or portions thereof, to target match values to determine if the packet is at or near its target destination. In flat addressing mode, where the DLID space may be partitioned uniformly across all 6 routing tables, the target match values may simply designate a region of the DLID space. In hierarchical addressing mode, the target values may be configured to signify that the packet has reached its target at the first level hierarchy, the second level hierarchy, or the final destination switch, etc. The target match values may be provided by the CSRs.

Selection parameter compression module 704 may be configured to consolidate the relevant information or parameters (e.g., RC, VL, DLID range and X bits) into an LUT index. The LUT index serves as an address into the Oport down-select LUT 706. Although the LUT index may, in general, be of any bit length (corresponding to an LUT of unlimited size), in practice the size of the LUT will be limited by technology and/or cost constraints to some maximum value. Thus, the selection parameter compression module 704 may select a subset of the bits of the parameters (or otherwise compress or encode that information) to create an LUT index that matches the LUT size. The FM 108 may configure the CSRs 302 to determine the subset selection of bits, based on the topology of the network fabric. This strategy is based on the fact that, in general, not all of the parameter bits will be needed for any given topology or addressing mode.

In some network topologies, the VL of a packet may be incremented or decremented as it goes from hop to hop (moves along the routing path), in order to avoid topological deadlock in the fabric. In some embodiments, these changes in the VL may influence the down-select LUT decisions. As one possible example, as the VL reaches higher values, the down-selection process may be configured to choose more direct (minimal) Oports to guide the packet towards its destination.

Oport down-select lookup table (LUT) 706 may be configured to provide or indicate the 1 to 4 selected Oports (in this example) based on the LUT index that was generated. In some embodiments, the LUT may be programmed by the FM 108 based on the network fabric configuration and routing algorithms that are deployed on the FM.

Figure 8:
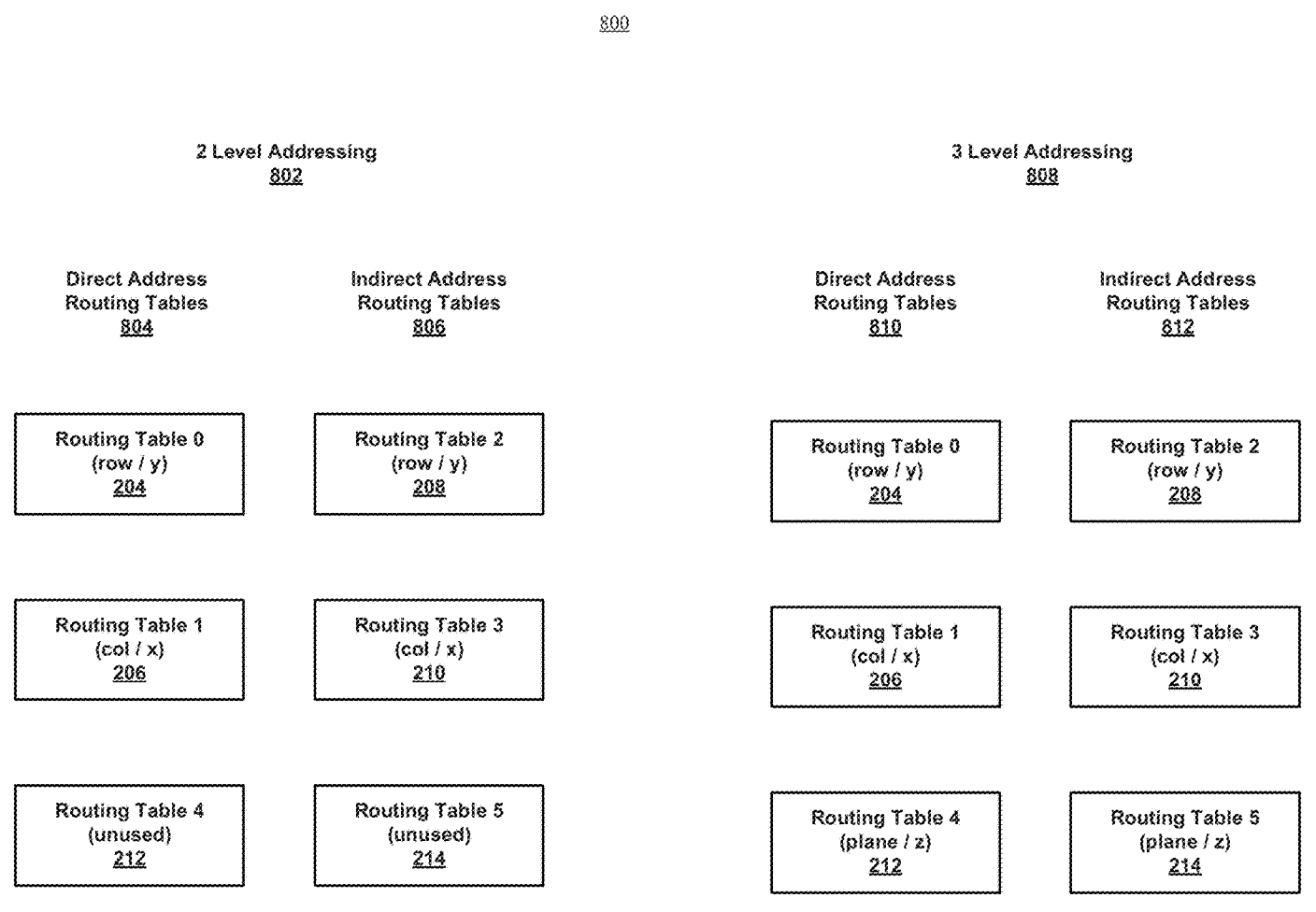

FIG. 8 illustrates routing tables 800 consistent with example embodiments of the present disclosure. Routing tables configured for a 2 level (or 2 dimensional) addressing scheme are shown at 802. The RTs are divided into direct addressing tables 804 and indirect addressing tables 806. RT 0 204 may be used for direct routing along a row (y-dimension) of the network fabric, and RT 1 206 for direct routing along a column (x-dimension) of the network fabric. RT 2 208 may be used for indirect routing along a row (y-dimension) of the network fabric, and RT 3 210 for indirect routing along a column (x-dimension) of the network fabric. In this example of 2 level addressing, only 4 of the 6 available RTs are used, leaving RT 4 212 and RT 5 214 unused.

Routing tables configured for a 3 level (or 3 dimensional) addressing scheme are shown at 808. The RTs are divided into direct addressing tables 810 and indirect addressing tables 812. RT 0 204 may be used for direct routing along a row (y-dimension) of the network fabric, RT 1 206 for direct routing along a column (x-dimension) of the network fabric, and RT 4 212 for direct routing along a plane (z-dimension) of the network fabric. RT 2 208 may be used for indirect routing along a row (y-dimension) of the network fabric, RT 3 210 for indirect routing along a column (x-dimension) of the network fabric, and RT 5 214 for indirect routing along a plane (z-dimension) of the network fabric.

Figure 9:
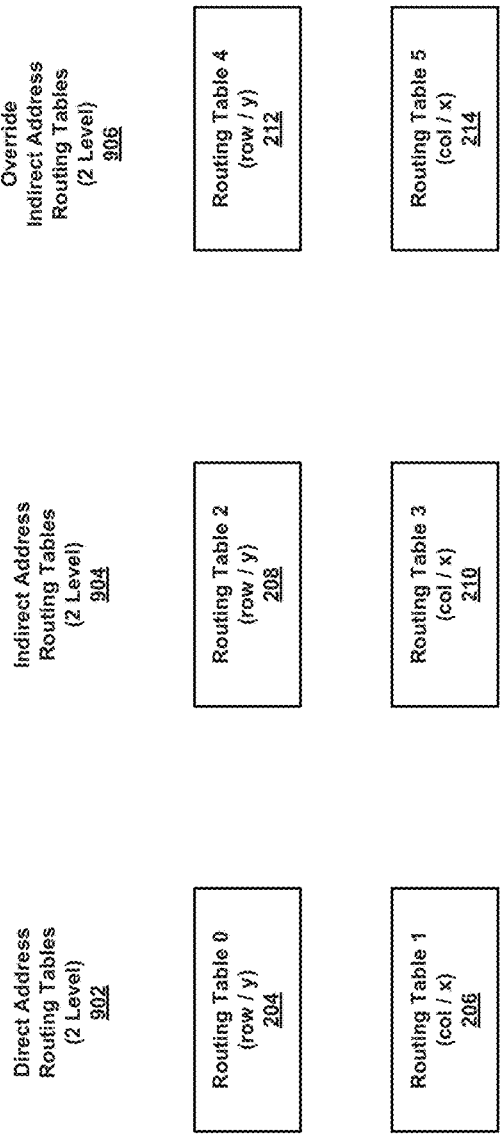
FIG. 9 illustrates routing tables consistent with other example embodiments of the present disclosure.

FIG. 9 illustrates routing tables 900 consistent with other example embodiments of the present disclosure. Routing tables configured for a 2 level (or 2 dimensional) addressing scheme with fault override capability are shown. The RTs are divided into direct addressing tables 902 and indirect addressing tables 904. As described previously, in connection with FIG. 8, RT 0 204 may be used for direct routing along a row (y-dimension) of the network fabric, and RT 1 206 for direct routing along a column (x-dimension) of the network fabric. RT 2 208 may be used for indirect routing along a row (y-dimension) of the network fabric, and RT 3 210 for indirect routing along a column (x-dimension) of the network fabric. The otherwise unused RTs (RT4 212 and RT5 214) are now configured to provide fault override indirect addressing along the row and column directions respectively.

Figure 10:
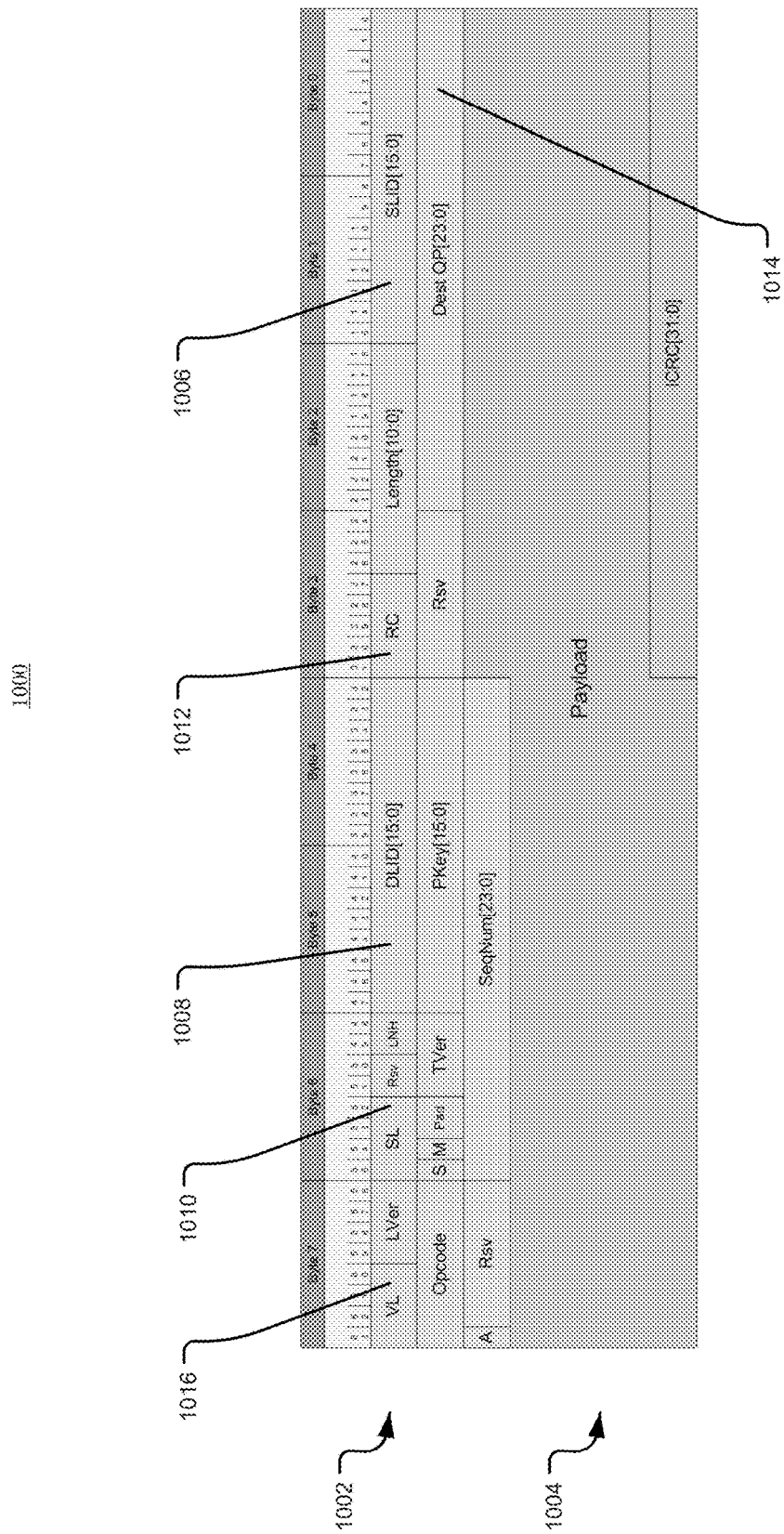
FIG. 10 illustrates an example packet format consistent with an embodiment of the present disclosure.

FIG. 10 illustrates an example packet format 1000 consistent with an embodiment of the present disclosure. The packet format shown is a modified Infiniband packet and includes a header 1002, configured to convey control and routing information, and a body 1004 configured to carry the data payload. The header 1002 is shown to include fields for the DLID 1008, the routing control (RC) 1012, and the virtual lane (VL) 1016. Additional fields in the header, containing values which may be expected to remain constant during transmission of a stream of packets between a source node and end node pair where ordering is required, can be used as elements to generate the hash value previously described. These fields may include, for example, the service level (SL) field 1010, the source location ID (SLID) field 1006 and the Dest QP field 1014.

A number of illustrative examples of routing possibilities, consistent with embodiments of the present disclosure, are outlined below in a pseudo code format. These represent, of course, only a few of the possibilities that are afforded through the flexible configurable distributed routing table architecture described herein.

A. Flat Addressing example
   (Deterministic)
      A routing table is selected from DLID[12:11]
      An address (entry within the table) is selected from DLID[10:1]
      An Oport is selected from the RT entry based on {DLID[0], 2 Hash bits}
   (Adaptive)
      A routing table is selected from DLID[12:11]
      An address (entry within the table) is selected from DLID[10:1]
      Oport1 is selected from the entry based on {DLID[0], 2 Rand bits}
      Oport2 is selected from the entry based on {DLID[0], (2 Rand bits)+1}
      The Oport with lower congestion is chosen
B. 2-level Hierarchical Addressing example (e.g., as in Fig. 8-802)
   For this example:

```
DLID[15:12] represents a row in the fabric hierarchy
DLID[11:8] represents a column in the fabric hierarchy
DLID[7:4] represents a node in the fabric hierarchy
"right row" means DLID row matches switch row
"right col" means DLID col matches switch col
"at target" means right row and right col
(Deterministic Minimal)
RT0 address = {DLID[15:12], 4 Hash bits, DLID[7:6]} if at target
RT0 address = {DLID[15:12], 6 Hash bits} if not at target
RT1 address = {DLID[11:8], 6 Hash bits }
Oport select = {DLID[5:4], 1 Hash bit} if at target
Oport select = {3 Hash bits} if not at target
Route using 1 direct column hop and 1 direct row hop,
if at wrong col use RT1, else use RT0
(Deterministic Non-Minimal)
RT0 address = {DLID[15:12], 4 Hash bits, DLID[7:6]} if at target
RT0 address = {DLID[15:12], 6 Hash bits} if not at target
RT1 address = {DLID[11:8], 6 Hash bits }
RT2 address = {10 Hash bits}
RT3 address = {10 Hash bits}
Oport select = {DLID[5:4], 1 Hash bit} if at target
Oport select = {3 Hash bits} if not at target
Route using 1 indirect column hop and 1 indirect row hop, (VL = 0),
take 1 direct column hop and 1 direct row hop, (VL = 1)
If at right col and right row, use RT0
If VL = 0, use RT3 if it is valid to take an indirect col hop
If VL = 0 and RT3 entry is invalid (X bits set),
        use RT2 to take an indirect row hop.
If VL = 0 and RT3 and RT2 entries are invalid, increment VL and:
        If wrong col, use RT1
    Else use RT0
If VL = 1 and wrong col, use RT1
If VL = 1 and right col, use RT0
```

All the entries in RT3 are marked invalid for the column (x) direction input ports to force the usage of the RT2 table once a column hop is taken. All the entries in RT2 and RT3 are marked invalid for the row (y) direction input port to force the usage of RT1 and RT0 to go direct once column and row random hops are taken.

```
(Adaptive)
RT0 address = {DLID[15:12], 4 Rand bits, DLID[7:6]} if at target
RT0 address = {DLID[15:12], 6 Rand bits} if not at target
RT1 address = {DLID[11:8], 6 Rand bits }
RT2 address = {10 Rand bits}
RT3 address = {10 Rand bits}
Oport1 is selected from the entry based on {DLID[0], 2 Rand bits}
Oport2 is selected from the entry based on {DLID[0], (2 Rand bits)+1}
Attempt direct route first, if congested use indirect route.
If at right col and right row, use RT0
If at wrong col, VL = 0 and RT3 entry is valid,
        use RT3 and RT1 to take either an indirect or direct col hop.
        Increment VL if direct col hop is taken.
If at wrong col, VL = 0, and RT3 entry is invalid,
        If RT2 entry is valid,
                use RT2 or RT1 to take either an indirect row hop or a direct
                col hop.
                Increment VL if direct col hop is taken.
If at right col, VL = 0, and RT2 entry is valid,
        use RT2 and RT0 to take either an indirect or direct row hop.
        Increment VL if direct row hop is taken.
If at right col, VL = 0, and RT2 entry is invalid,
        use RT0 to take a direct row hop.
        Increment VL.
If VL = 0, RT3 and RT2 entries are invalid, increments VL and:
        If wrong col, use RT1
    Else use RT0
If VL = 1 and at wrong col, use RT1
If VL = 1 and at right col, use RT0
In each case above, 2 choices are provided by each RT table.
C. 2-level Hierarchical Addressing with Override example (e.g., as in Fig. 9)
    RT4 provides overrides for RT2 addressing to avoid network faults
    RT5 provides overrides for RT3 addressing to avoid network faults
    RT4, RT5 entries default to "invalid" X bit setting, but are changed to "valid"
    by fabric manager as faults are detected. If an RT4 or RT5 entry is valid, it
    will override the corresponding RT2 or RT3 entry.
```

FIG. 11 illustrates a flowchart of operations 1100 of one example embodiment consistent with the present disclosure. The operations provide a method for routing a packet from an input port of a switch to an output port of the switch. At operation 1110, routing tables are configured to store a plurality of entries. The entries are further configured to store one or more output port identifiers of the switch. At operation 1120, an entry from one or more of the routing tables is selected. The selection is based in part on a first subset of a Destination Location ID (DLID) associated with the packet. At operation 1130, a further selection is made from one or more output ports of the selected entries, the selected output ports based in part on a second subset of the DLID.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may include, for example, singly or in any combination, hardwired circuitry, programmable circuitry, state machine circuitry, and/or firmware (for example, executing on an integrated circuit) that stores instructions executed by programmable circuitry. An application (or "app") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for switching systems employing distributed routing tables to provide improved support for multiple network topologies, configurations and routing modes. The following examples pertain to further embodiments.

According to Example 1 there is provided a switch for routing a packet from an input port of the switch to an output port of the switch. The switch may include: a plurality of the input ports; a plurality of the output ports; a plurality of routing modules, each of the routing modules associated with one of the input ports. The routing modules may further include one or more memory modules to store a plurality of routing tables to store a plurality of entries, each of the entries to store one or more output port identifiers; a table address generation module to select an entry from one or more of the routing tables, the entry selection based in part on a first subset of a Destination Location ID (DLID) associated with the packet; and the table address generation module further to select one or more output ports from the selected entries, the selected output ports based in part on a second subset of the DLID.

Example 2 may include the subject matter of Example 1, and the table address generation module is further to select the entry from the routing tables additionally based on a first hash of selected data values of a header of the packet; and further to select the one or more output ports based on a combination of the second subset of the DLID and a second hash of the selected data values of the packet header.

Example 3 may include the subject matter of Examples 1 and 2, and the table address generation module is further to select the entry from the routing tables additionally based on a first randomly generated value; and further to select the one or more output ports based on a combination of the second subset of the DLID and a second randomly generated value.

Example 4 may include the subject matter of Examples 1-3, and the routing table entries are to be programmable by a network manager.

Example 5 may include the subject matter of Examples 1-4, and one or more of the routing tables are to indicate output ports that route the packet on a direct path to a destination associated with the DLID.

Example 6 may include the subject matter of Examples 1-5, and one or more of the routing tables are to indicate output ports that route the packet on an indirect path to a destination associated with the DLID.

Example 7 may include the subject matter of Examples 1-6, and one or more of the routing tables are to indicate output ports that route the packet along a path to avoid a network fault.

Example 8 may include the subject matter of Examples 1-7, further including an output port down-select module to reduce the number of the selected output ports based on selected data values of a header of the packet and further based on status bits of the selected output ports.

Example 9 may include the subject matter of Examples 1-8, further including an output port final-selection module to select a final output port from the reduced number of output ports based on network congestion information associated with each of the one or more output ports.

Example 10 may include the subject matter of Examples 1-9, and the switch is incorporated in a System-in-a-Chip (SoC) and further includes a processor (CPU).

According to Example 11 there is provided a routing system of a switch, for routing a packet from an input port of the switch to an output port of the switch. The routing system may include: one or more memory modules to store a plurality of routing tables to store a plurality of entries, each of the entries to store one or more output port identifiers; a table address generation module to select an entry from one or more of the routing tables, the entry selection based in part on a first subset of a Destination Location ID (DLID) associated with the packet; and the table address generation module further to select one or more output ports from the selected entries, the selected output ports based in part on a second subset of the DLID.

Example 12 may include the subject matter of Example 11, and the table address generation module is further to select the entry from the routing tables additionally based on a first hash of selected data values of a header of the packet; and further to select the one or more output ports based on a combination of the second subset of the DLID and a second hash of the selected data values of the packet header.

Example 13 may include the subject matter of Examples 11 and 12, and the table address generation module is further to select the entry from the routing tables additionally based on a first randomly generated value; and further to select the one or more output ports based on a combination of the second subset of the DLID and a second randomly generated value.

Example 14 may include the subject matter of Examples 11-13, and the routing table entries are to be programmable by a network manager.

Example 15 may include the subject matter of Examples 11-14, and one or more of the routing tables are to indicate output ports that route the packet on a direct path to a destination associated with the DLID.

Example 16 may include the subject matter of Examples 11-15, and one or more of the routing tables are to indicate output ports that route the packet on an indirect path to a destination associated with the DLID.

Example 17 may include the subject matter of Examples 11-16, and one or more of the routing tables are to indicate output ports that route the packet along a path to avoid a network fault.

Example 18 may include the subject matter of Examples 11-17, further including an output port down-select module to reduce the number of the selected output ports based on selected data values of a header of the packet and further based on status bits of the selected output ports.

Example 19 may include the subject matter of Examples 11-18, further including an output port final-selection module to select a final output port from the reduced number of output ports based on network congestion information associated with each of the one or more output ports.

According to Example 20 there is provided a method for routing a packet from an input port of a switch to an output port of the switch. The method may include: configuring a plurality of routing tables to store a plurality of entries, each of the entries to store one or more output port identifiers; selecting an entry from one or more of the routing tables, the entry selection based in part on a first subset of a Destination Location ID (DLID) associated with the packet; and selecting one or more output ports from the selected entries, the selected output ports based in part on a second subset of the DLID.

Example 21 may include the subject matter of Example 20, further including: selecting the entry from the routing tables additionally based on a first hash of selected data values of a header of the packet; and selecting the one or more output ports based on a combination of the second subset of the DLID and a second hash of the selected data values of the packet header.

Example 22 may include the subject matter of Examples 20 and 21, further including: selecting the entry from the routing tables additionally based on a first randomly generated value; and selecting the one or more output ports based on a combination of the second subset of the DLID and a second randomly generated value.

Example 23 may include the subject matter of Examples 20-22, and one or more of the routing tables are to indicate output ports that route the packet on a direct path to a destination associated with the DLID.

Example 24 may include the subject matter of Examples 20-23, and one or more of the routing tables are to indicate output ports that route the packet on an indirect path to a destination associated with the DLID.

Example 25 may include the subject matter of Examples 20-24, and one or more of the routing tables are to indicate output ports that route the packet along a path to avoid a network fault.

Example 26 may include the subject matter of Examples 20-25, further including reducing the number of the selected output ports based on selected data values of a header of the packet and further based on status bits of the selected output ports.

Example 27 may include the subject matter of Examples 20-26, further including selecting a final output port from the reduced number of output ports based on network congestion information associated with each of the one or more output ports.

According to Example 28 there is provided at least one computer-readable storage medium having instructions stored thereon which when executed by a processor result in the following operations for routing a packet from an input port of a switch to an output port of the switch. The operations may include: configuring a plurality of routing tables to store a plurality of entries, each of the entries to store one or more output port identifiers; selecting an entry from one or more of the routing tables, the entry selection based in part on a first subset of a Destination Location ID (DLID) associated with the packet; and selecting one or more output ports from the selected entries, the selected output ports based in part on a second subset of the DLID.

Example 29 may include the subject matter of Example 28, further including: selecting the entry from the routing tables additionally based on a first hash of selected data values of a header of the packet; and selecting the one or more output ports based on a combination of the second subset of the DLID and a second hash of the selected data values of the packet header.

Example 30 may include the subject matter of Examples 28 and 29, further including: selecting the entry from the routing tables additionally based on a first randomly generated value; and selecting the one or more output ports based on a combination of the second subset of the DLID and a second randomly generated value.

Example 31 may include the subject matter of Examples 28-30, and one or more of the routing tables are to indicate output ports that route the packet on a direct path to a destination associated with the DLID.

Example 32 may include the subject matter of Examples 28-31, and one or more of the routing tables are to indicate output ports that route the packet on an indirect path to a destination associated with the DLID.

Example 33 may include the subject matter of Examples 28-32, and one or more of the routing tables are to indicate output ports that route the packet along a path to avoid a network fault.

Example 34 may include the subject matter of Examples 28-33, further including reducing the number of the selected output ports based on selected data values of a header of the packet and further based on status bits of the selected output ports.

Example 35 may include the subject matter of Examples 28-34, further including selecting a final output port from the reduced number of output ports based on network congestion information associated with each of the one or more output ports.

According to Example 36 there is provided a system for routing a packet from an input port of a switch to an output port of the switch. The system may include: means for configuring a plurality of routing tables to store a plurality of entries, each of the entries to store one or more output port identifiers; means for selecting an entry from one or more of the routing tables, the entry selection based in part on a first subset of a Destination Location ID (DLID) associated with the packet; and means for selecting one or more output ports from the selected entries, the selected output ports based in part on a second subset of the DLID.

Example 37 may include the subject matter of Example 36, further including: means for selecting the entry from the routing tables additionally based on a first hash of selected data values of a header of the packet; and means for selecting the one or more output ports based on a combination of the second subset of the DLID and a second hash of the selected data values of the packet header.

Example 38 may include the subject matter of Examples 36 and 37, further including: means for selecting the entry from the routing tables additionally based on a first randomly generated value; and means for selecting the one or more output ports based on a combination of the second subset of the DUD and a second randomly generated value.

Example 39 may include the subject matter of Examples 36-38, and one or more of the routing tables are to indicate output ports that route the packet on a direct path to a destination associated with the DUD.

Example 40 may include the subject matter of Examples 36-39, and one or more of the routing tables are to indicate output ports that route the packet on an indirect path to a destination associated with the DUD.

Example 41 may include the subject matter of Examples 36-40, and one or more of the routing tables are to indicate output ports that route the packet along a path to avoid a network fault.

Example 42 may include the subject matter of Examples 36-41, further including means for reducing the number of the selected output ports based on selected data values of a header of the packet and further based on status bits of the selected output ports.

Example 43 may include the subject matter of Examples 36-42, further including means for selecting a final output port from the reduced number of output ports based on network congestion information associated with each of the one or more output ports.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A switch for routing a packet from an input port of said switch to an output port of said switch, said switch comprising:
    a plurality of said input ports;
    a plurality of said output ports;
    a plurality of routing modules, each of said routing modules associated with one of said input ports; and
    said routing modules comprising:
    one or more memory modules to store a plurality of routing tables to store a plurality of entries, each of said entries to store one or more output port identifiers;
    a table address generation module to select an entry from one or more of said routing tables, said entry selection based in part on a first subset of a Destination Location ID (DLID) associated with said packet;
    said table address generation module further to select one or more output ports from said selected entries, said selected output ports based in part on a second subset of said DUD; and
    an output port down-select module to reduce the number of said selected output ports based on selected data values of a header of said packet and further based on status bits of said selected output ports.

2. The switch of claim 1, wherein said table address generation module is further to select said entry from said routing tables additionally based on a first hash of selected data values of a header of said packet; and further to select said one or more output ports based on a combination of said second subset of said DLID and a second hash of said selected data values of said packet header.

3. The switch of claim 1, wherein said table address generation module is further to select said entry from said routing tables additionally based on a first randomly generated value; and further to select said one or more output ports based on a combination of said second subset of said DLID and a second randomly generated value.

4. The switch of claim 1, wherein said routing table entries are to be programmable by a network manager.

5. The switch of claim 1, wherein one or more of said routing tables are to indicate output ports that route said packet on a direct path to a destination associated with said DLID.

6. The switch of claim 1, wherein one or more of said routing tables are to indicate output ports that route said packet on an indirect path to a destination associated with said DLID.

7. The switch of claim 1, wherein one or more of said routing tables are to indicate output ports that route said packet along a path to avoid a network fault.

8. The switch of claim 1, further comprising an output port final-selection module to select a final output port from said reduced number of output ports based on network congestion information associated with each of said one or more output ports.

9. The switch of claim 1, wherein said switch is incorporated in a System-in-a-Chip (SoC) and further comprises a processor (CPU).

10. A routing system of a switch, for routing a packet from an input port of said switch to an output port of said switch, said routing system comprising:
    one or more memory modules to store a plurality of routing tables to store a plurality of entries, each of said entries to store one or more output port identifiers;
    a table address generation module to select an entry from one or more of said routing tables, said entry selection based in part on a first subset of a Destination Location ID (DLID) associated with said packet; and said table address generation module further to select one or more output ports from said selected entries, said selected output ports based in part on a second subset of said DUD; and an output port down-select module to reduce the number of said selected output ports based on selected data values of a header of said packet and further based on status bits of said selected output ports.

11. The routing system of claim 10, wherein said table address generation module is further to select said entry from said routing tables additionally based on a first hash of selected data values of a header of said packet; and further to select said one or more output ports based on a combination of said second subset of said DLID and a second hash of said selected data values of said packet header.

12. The routing system of claim 10, wherein said table address generation module is further to select said entry from said routing tables additionally based on a first randomly generated value; and further to select said one or more output ports based on a combination of said second subset of said DLID and a second randomly generated value.

13. The routing system of claim 10, wherein said routing table entries are to be programmable by a network manager.

14. The routing system of claim 10, wherein one or more of said routing tables are to indicate output ports that route said packet on a direct path to a destination associated with said DLID.

15. The routing system of claim 10, wherein one or more of said routing tables are to indicate output ports that route said packet on an indirect path to a destination associated with said DLID.

16. The routing system of claim 10, wherein one or more of said routing tables are to indicate output ports that route said packet along a path to avoid a network fault.

17. A method for routing a packet from an input port of a switch to an output port of said switch, said method comprising:
configuring a plurality of routing tables to store a plurality of entries, each of said entries to store one or more output port identifiers;
selecting an entry from one or more of said routing tables, said entry selection based in part on a first subset of a Destination Location ID (DLID) associated with said packet;
selecting one or more output ports from said selected entries, said selected output ports based in part on a second subset of said DUD; and
reducing the number of said selected output ports based on selected data values of a header of said packet and further based on status bits of said selected output ports.

18. The method of claim 17, further comprising:
selecting said entry from said routing tables additionally based on a first hash of selected data values of a header of said packet; and
selecting said one or more output ports based on a combination of said second subset of said DLID and a second hash of said selected data values of said packet header.

19. The method of claim 17, further comprising:
selecting said entry from said routing tables additionally based on a first randomly generated value; and
selecting said one or more output ports based on a combination of said second subset of said DLID and a second randomly generated value.

20. The method of claim 17, wherein one or more of said routing tables are to indicate output ports that route said packet on a direct path to a destination associated with said DLID.

21. The method of claim 17, wherein one or more of said routing tables are to indicate output ports that route said packet on an indirect path to a destination associated with said DUD.

22. The method of claim 17, wherein one or more of said routing tables are to indicate output ports that route said packet along a path to avoid a network fault.

23. The method of claim 17, further comprising selecting a final output port from said reduced number of output ports based on network congestion information associated with each of said one or more output ports.

24. At least one computer-readable storage medium having instructions stored thereon which when executed by a processor result in the following operations for routing a packet from an input port of a switch to an output port of said switch, said operations comprising:
configuring a plurality of routing tables to store a plurality of entries, each of said entries to store one or more output port identifiers;
selecting an entry from one or more of said routing tables, said entry selection based in part on a first subset of a Destination Location ID (DLID) associated with said packet; and
selecting one or more output ports from said selected entries, said selected output ports based in part on a second subset of said DLID;
reducing the number of said selected output ports based on selected data values of a header of said packet and further based on status bits of said selected output ports.

25. The computer-readable storage medium of claim 24, further comprising:
selecting said entry from said routing tables additionally based on a first hash of selected data values of a header of said packet; and
selecting said one or more output ports based on a combination of said second subset of said DLID and a second hash of said selected data values of said packet header.

26. The computer-readable storage medium of claim 24, further comprising:
selecting said entry from said routing tables additionally based on a first randomly generated value; and
selecting said one or more output ports based on a combination of said second subset of said DLID and a second randomly generated value.

27. The computer-readable storage medium of claim 24, wherein one or more of said routing tables are to indicate output ports that route said packet on a direct path to a destination associated with said DLID.

28. The computer-readable storage medium of claim 24, wherein one or more of said routing tables are to indicate output ports that route said packet on an indirect path to a destination associated with said DLID.

29. The computer-readable storage medium of claim 24, wherein one or more of said routing tables are to indicate output ports that route said packet along a path to avoid a network fault.

30. A system for routing a packet from an input port of a switch to an output port of said switch, said system comprising:
means for configuring a plurality of routing tables to store a plurality of entries, each of said entries to store one or more output port identifiers;

means for selecting an entry from one or more of said routing tables, said entry selection based in part on a first subset of a Destination Location ID (DLID) associated with said packet; and means for selecting one or more output ports from said selected entries, said selected output ports based in part on a second subset of said DUD; and means for reducing the number of said selected output ports based on selected data values of a header of said packet and further based on status bits of said selected output ports.

31. The system of claim 30, further comprising:

means for selecting said entry from said routing tables additionally based on a first hash of selected data values of a header of said packet; and means for selecting said one or more output ports based on a combination of said second subset of said DLID and a second hash of said selected data values of said packet header.

32. The system of claim 30, further comprising:

means for selecting said entry from said routing tables additionally based on a first randomly generated value; and means for selecting said one or more output ports based on a combination of said second subset of said DLID and a second randomly generated value.

33. The system of claim 31, further comprising:

means for selecting said entry from said routing tables additionally based on a first randomly generated value; and means for selecting said one or more output ports based on a combination of said second subset of said DLID and a second randomly generated value.

\* \* \* \* \*